US011139858B1

(12) United States Patent
Covell et al.

(10) Patent No.: US 11,139,858 B1
(45) Date of Patent: Oct. 5, 2021

(54) WIRELESS COMMUNICATION MANAGEMENT

(71) Applicant: International Business Machines Corporation, Armonk, NY (US)

(72) Inventors: Jacob Thomas Covell, New York, NY (US); Alvin Zhang, Somerville, MA (US); Robert Huntington Grant, Marietta, GA (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/937,718

(22) Filed: Jul. 24, 2020

(51) Int. Cl.
| | |
|---|---|
| *H04B 5/00* | (2006.01) |
| *H04W 8/00* | (2009.01) |
| *H04W 24/02* | (2009.01) |
| *G06N 20/00* | (2019.01) |
| *G06F 21/32* | (2013.01) |
| *H04W 4/80* | (2018.01) |

(52) U.S. Cl.
CPC .......... *H04B 5/0031* (2013.01); *G06F 21/32* (2013.01); *G06N 20/00* (2019.01); *H04W 4/80* (2018.02); *H04W 8/005* (2013.01); *H04W 24/02* (2013.01)

(58) Field of Classification Search
CPC .... H04B 5/0031; H04W 24/02; H04W 8/005; H04W 4/80; G06F 21/32; G06N 20/00
USPC .......................................................... 455/41.1
See application file for complete search history.

(56) References Cited

U.S. PATENT DOCUMENTS

| | | | |
|---|---|---|---|
| 8,737,986 B2 | 5/2014 | Rhoads et al. | |
| 8,923,761 B2 | 12/2014 | Hillan | |
| 9,071,282 B1 | 6/2015 | Want et al. | |
| 9,561,324 B2 | 2/2017 | Estes | |
| 10,219,222 B2 | 2/2019 | Schillings et al. | |
| 10,341,882 B2 | 7/2019 | Hall et al. | |
| 2011/0165862 A1* | 7/2011 | Yu ..................... | H04M 1/72412 455/411 |
| 2013/0222137 A1* | 8/2013 | Alameh ............ | H04M 1/72454 340/573.1 |
| 2017/0193466 A1* | 7/2017 | Clark ................... | G06Q 20/405 |

(Continued)

FOREIGN PATENT DOCUMENTS

| | | |
|---|---|---|
| CN | 106299667 A | 1/2017 |
| KR | 1020130105259 A | 9/2013 |

OTHER PUBLICATIONS

IBM, "Made in IBM Labs: Two Factor Security for Mobile Transactions", IBM Research Media Release, Oct. 18, 2013, 2 pages.

(Continued)

*Primary Examiner* — Eugene Yun
(74) *Attorney, Agent, or Firm* — James L. Olsen

(57) ABSTRACT

Aspects of the present disclosure relate to wireless communication management. A set of sensor data can be collected by a first device paired to a second device using a wireless communication (WC) protocol. The set of sensor data can be analyzed to determine whether a rule for adjusting a WC activation threshold is satisfied, the WC activation threshold defining a distance at which the first device and second device are permitted to transfer data to each other. The WC activation threshold can be adjusted in response to determining that the rule for adjusting the WC activation threshold is satisfied.

17 Claims, 9 Drawing Sheets

(56) References Cited

U.S. PATENT DOCUMENTS

2018/0061404 A1* 3/2018 Devaraj .................. G10L 15/22

OTHER PUBLICATIONS

Conlan-Donnelly, M., "Near-Field Communication Technology Starts to Transform Retail", May 16, 2018, 5 pages.
Shepherd et al., "The Applicability of Ambient Sensors as Proximity Evidence for NFC Transactions", In 2017 IEEE Security and Privacy Workshops, 10 pages.
Halevi et al., "Secure Proximity Detection for NFC Devices Based on Ambient Sensor Data", In European Symposium on Research in Computer Security, Sep. 2012, 18 pages.
Mell et al., "The NIST Definition of Cloud Computing", Recommendations of the National Institute of Standards and Technology, Sep. 2011, 7 pages.

* cited by examiner

Transaction Log
300

- Transaction 1:
    - Device #1
    - Sensor Data
        - Biometric Reading: 100 BPM
        - Location of Transaction: Library
        - Time of Transaction: 6:00 PM
        - Audio Clip from $t_1 \rightarrow t_2$
        - Image Data
    - Current WC Activation Threshold: 25m
    - Threshold Action: Maintain at 25m

- Transaction 2:
    - Device #2
    - Sensor Data
        - Biometric Reading: 80 BPM
        - Location of Transaction: Home
        - Time of Transaction: 7:00 PM
        - Audio Clip from $t_3 \rightarrow t_4$
        - Image Data
    - Current WC Activation Threshold: 25m
    - Threshold Action: Increase to 50m

- Transaction 3:
    - Device #2
    - Sensor Data
        - Biometric Reading: 120 BPM
        - Location of Transaction: Home
        - Time of Transaction: 9:00AM
        - Audio Clip from $t_5 \rightarrow t_6$
        - Image Data
    - Current WC Activation Threshold: 50m
    - Threshold Action: Decrease to 35m

FIG. 3

WIRELESS COMMUNICATION MANAGEMENT

BACKGROUND

The present disclosure relates generally to the field of wireless communication, and more particularly short range wireless communication management.

Short range wireless communication protocols such as near-field communication (NFC) and Bluetooth allow data transfer between devices using radio waves. The frequency and/or power associated with the wireless communication protocol directly affects the range, bit rate, and set-up time of the linkage between two devices. Short range wireless communication protocols can enable fast, reliable, secure, and convenient data transfer between neighboring devices.

SUMMARY

Aspects of the present disclosure relate to a method, system, and computer program product for wireless communication management. A set of sensor data can be collected by a first device paired to a second device using a wireless communication (WC) protocol. The set of sensor data can be analyzed to determine whether a rule for adjusting a WC activation threshold is satisfied, the WC activation threshold defining a distance at which the first device and second device are permitted to transfer data to each other. The WC activation threshold can be adjusted in response to determining that the rule for adjusting the WC activation threshold is satisfied.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 is a diagram depicting a transaction log, in accordance with embodiments of the present disclosure.

Figure 1:
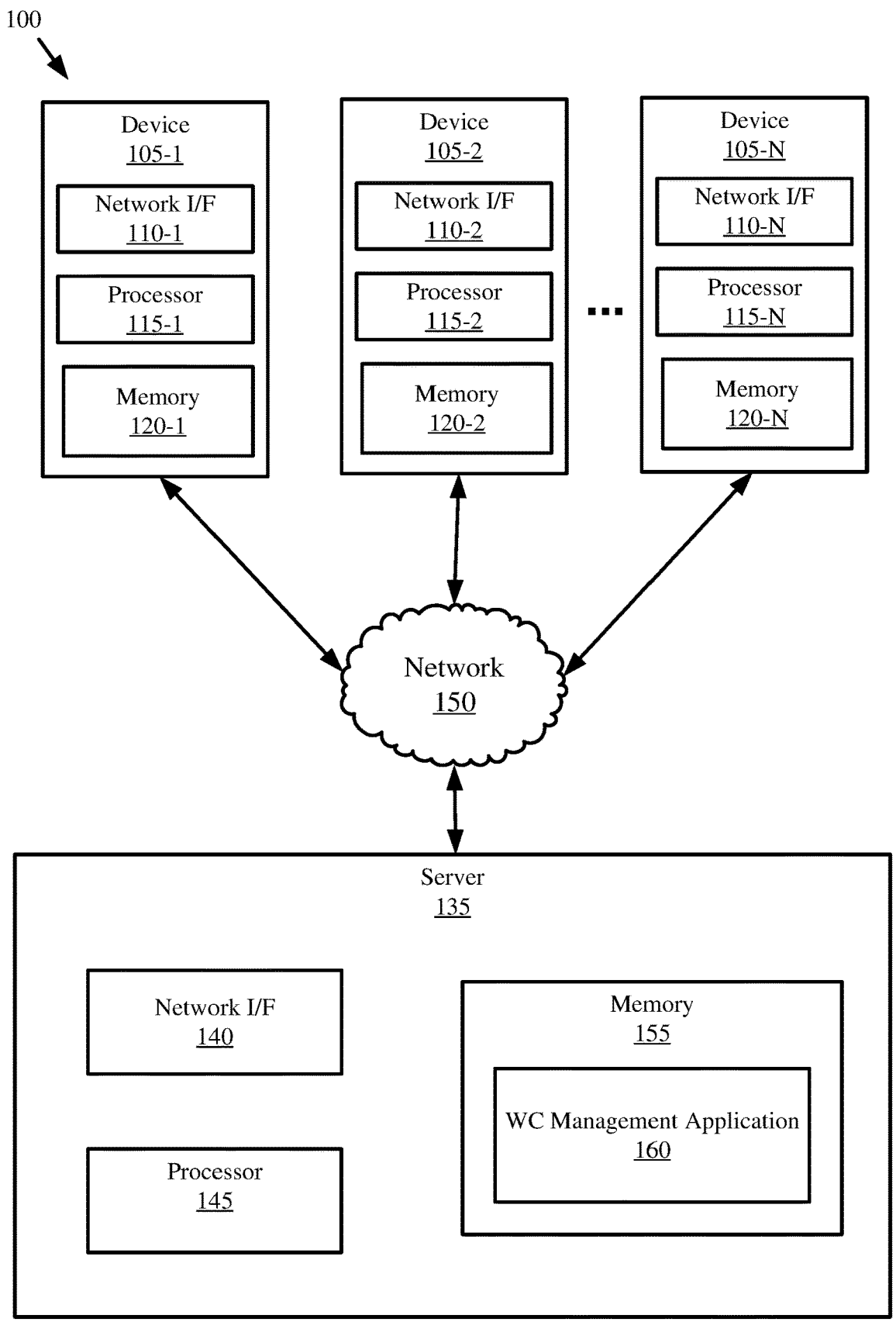
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of wireless communication, and more particularly to short range wireless communication management. While the present disclosure is not necessarily limited to such applications, various aspects of the disclosure may be appreciated through a discussion of various examples using this context.

As discussed herein "wireless communication protocols" refer to relatively short range (e.g., 1 cm-200 m) wireless communication techniques. These protocols can include short-range point-to-point communications (e.g., wireless microphones, remote controls, radio-frequency identification (RFID), EnOcean, Wireless USB, TransferJet, dedicated short-range communications (DSRC), NFC), wireless sensor networks (e.g., ZigBee, personal area networks (PAN), Bluetooth, ultra-wideband (UWB)), and wireless networks (e.g., wireless LAN (WLAN)).

As discussed herein, an "activation threshold" associated with a wireless communication protocol refers to the distance at which two devices are enabled to effectively communicate (e.g., transfer data to each other). In some embodiments, activation thresholds can be set by altering the physical characteristics of the wireless communication (e.g., altering the frequency and/or power of the wireless link can shorten the range). In some embodiments, activation thresholds can be defined within the maximum range of the wireless link. For example, a user can explicitly set a range at which pairing is permitted to occur, even if the maximum range at which pairing can occur exceeds this set range. This can be completed based on at least one metric (e.g., distance, signal strength) between the to-be-paired devices. As an example, if an activation threshold associated with a given device is 50 meters, the maximum range the device can interact with (e.g., read data from or write data to) another device using a given wireless communication protocol is 50 meters.

As discussed herein, a "linkage," "link," "pairing," or "pair" refers to a successful wireless communication protocol established between two devices. That is, transceivers associated with respective devices are configured to receive data from or transfer data to corresponding transceivers of the devices they are paired or linked to.

Wireless communication protocols such as near-field communication (NFC) and Bluetooth allow data transfer between devices using radio waves. The frequency and/or power associated with the wireless communication protocol directly affects the range, bit rate, and set-up time of the linkage between two devices. Wireless communication protocols can enable fast, reliable, secure, and convenient data transfer between neighboring devices.

Currently, issues exist in the field of wireless communication protocols where wireless linkages are unintentionally established and where wireless linkages cannot be established when intended. These issues stem from wireless communication activation thresholds not being fine-tuned based on the intentions of users. Altering the activation thresholds of short range wireless communication devices to fit a user's intention can be beneficial in a variety of manners. First, usability of the devices is improved, as unintentional linkages can be reduced while successful intended linkages can be increased. Further, security of these system can be enhanced with the reduction of unintended pairings (which can pose a security risk). Further still, efficient management of computing resources such as processor utilization, bandwidth, and power consumption can be improved as unintended pairings (which consume computing resources) are reduced.

Aspects of the present disclosure relate to adjusting WC activation thresholds based on collected sensor data. A set of sensor data can be collected by a first device paired to a second device using a wireless communication (WC) protocol. The set of sensor data can be analyzed to determine whether a rule for adjusting a WC activation threshold is satisfied, the WC activation threshold defining a distance at which the first device and second device are permitted to transfer data to each other. The WC activation threshold can be adjusted in response to determining that the rule for adjusting the WC activation threshold is satisfied.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a wireless communication (WC) management application 160. The WC management application 160 can be configured to manage activation thresholds associated with wireless communication protocols between devices 105. The WC management application 160 can be configured to receive and analyze sensor data associated with corresponding devices to determine whether adjustments to WC activation thresholds should be made. In embodiments, sensor data such as biometric data, location data, audio data, time data, network data (e.g., browsing data) and others are analyzed to determine whether a condition for altering a WC activation threshold is met. Ultimately, the WC management application 160 can alter WC activation thresholds to match the intentions of users based on sensor data associated with a WC transaction.

WC activation thresholds can be set by the WC management application 160 on a device basis. For example, a first device can have its corresponding WC activation threshold altered such that no other device can communicate with the first device beyond a first WC activation threshold (e.g., 50 meters). WC activation thresholds can also be set for pairs of devices. As an example, a WC activation threshold between a second and third device can be altered such that the second and third device can only pair within a second WC activation threshold (e.g., 1 meter).

In some embodiments, predictive WC activation threshold alterations can be made by the WC management application 160 before a WC transaction occurs. In these embodiments, a determination can be made whether a WC transaction is about to occur (e.g., based on sensor data associated with at least one device). Thereafter, sensor data can be analyzed to adjust the WC activation threshold prior to the transaction actually occurring.

Though this disclosure pertains to the collection of personal data (e.g., sensor data such as biometric data), it is noted that in embodiments, users opt-in to the system (e.g., the WC management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
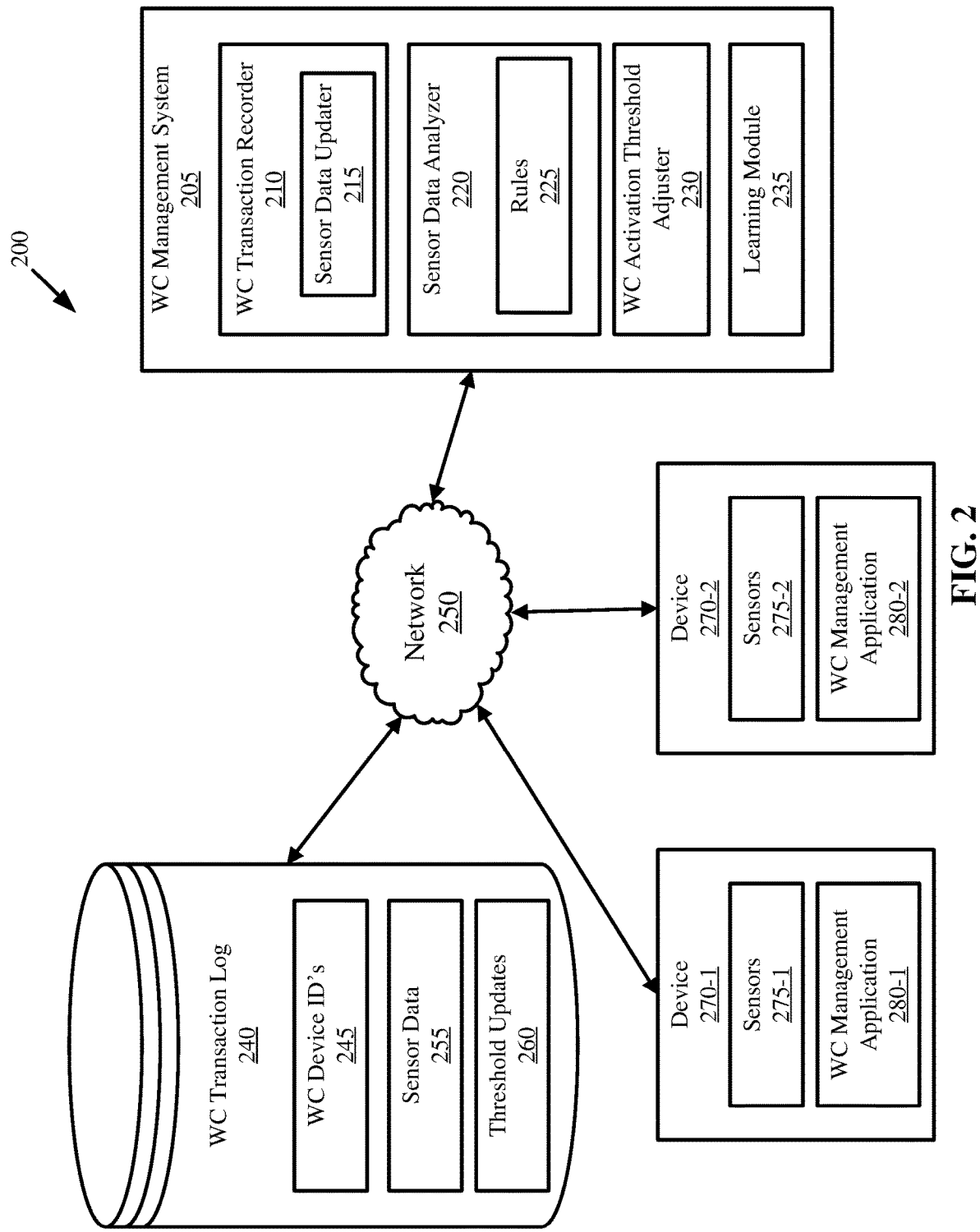
FIG. 2 is a block diagram illustrating an example network environment including a WC management system, in accordance with embodiments of the present disclosure.

Referring now to FIG. 2, shown is a block diagram illustrating an example network environment 200 in which illustrative embodiments of the present disclosure can be implemented. The network environment 200 includes a wireless communication (WC) management system 205, a WC transaction log 240, a device 270-1, and a device 270-2 (as referenced herein, devices 270-1 and 270-2 may be collectively referred to as "devices 270") communicatively coupled via network 250.

The WC management system 205 can be configured to manage WC activation thresholds associated with wireless linkages of devices 270-1 and 270-2. The WC management system 205 includes a WC transaction recorder 210, a sensor data analyzer 220, a WC threshold adjuster 230, and a learning module 235. In embodiments, the WC transaction recorder 210, sensor data analyzer 220, WC threshold adjuster 230, and learning module 235 can be processor executable instructions that can be executed by a dedicated or shared processor using received inputs (e.g., from devices 270).

The WC transaction recorder 210 can be configured to record wireless transactions that occur between devices 270. In embodiments, the WC transaction recorder 210 stores transaction data in the WC transaction log 240, which may be integrated into the WC management system 205 (e.g., physically stored within the WC management system 205) or alternatively remotely located from and accessed by the WC management system 205 over the network 250. An example transaction log 300 is depicted in FIG. 3, to be discussed further below.

Transaction data stored within the WC transaction log 240 can include WC device identifications (ID's) 245 associated with WC transactions, sensor data 255 associated WC transactions, and threshold updates 260 associated with WC transactions, among other data. A sensor data updater 215 of the WC transaction recorder 210 can be configured to update sensor data associated with individual transactions. Sensor data associated with WC transactions may be collected by sensors 275-1 and sensors 275-2 of respective devices 270-1 and 270-2.

In embodiments, devices 270-1 and 270-2 include respective WC management applications 280-1 and 280-2 to allow sensor data collection and transmission to WC management system 205. Ultimately, the WC management applications 280-1 and 280-2 can be used to facilitate access to resources such as the WC transaction log 240 and WC management system 205 over the network 250 by the devices 270-1 and 270-2. In embodiments, authentication (e.g., two factor authentication) to the WC management applications 280-1 and 280-2 may be enforced to enhance security of the network environment 200.

Sensor data collected from the devices 270 can include, but is not limited to, biometric data (e.g., heart beats per minute, breaths per minute, glucose readings, etc.), visual data (e.g., image data), audio data (e.g., audio recordings), time data (e.g., day of week, time of day, etc.), location data (e.g., GPS data or location data collected from another positioning system (e.g., Bluetooth Low Energy (BLE) trilateration)), network activity data (e.g., browsing data), and others. Sensors 275-1 and 275-2 can include any suitable sensors for collecting sensor data, including, but not limited to, biometric sensors (e.g., heart rate monitors, breath rate monitors, glucose level monitors, etc.), cameras, microphones, GPS sensors, accelerometers, gyroscopes, and network interface controllers.

The sensor data analyzer 220 of the WC management system 205 can be configured to analyze the sensor data 255 associated with transactions within the WC transaction log 240 to determine whether a threshold adjustment should be made. To do so, the sensor data analyzer 220 can reference rules 225 that specify WC activation threshold adjustments to be made based on sensor data 255. In some embodiments, rules dictating WC activation threshold adjustments can be manually defined by a user. In some embodiments, rules dictating WC activation thresholds can be generated or adjusted using machine learning techniques, to be discussed further below.

A variety of rules 225 may be implemented to adjust WC activation thresholds. In embodiments, rules can indicate one or more conditions leading to particular activation threshold adjustments. In some embodiments, a sensor value being less than, greater than, or equal to a threshold sensor value causes a WC activation threshold adjustment. For example, if a biometric reading (e.g., 100 beats per minute (BPM)) is equal to or greater than a biometric reading threshold (e.g., 80 BPM), a determination can be made to increase a WC activation threshold (e.g., from 5 meters to 20 meters). As another example, if a decibel reading obtained from an audio recording (e.g., 60 db) exceeds a threshold (e.g., 50 db), then a determination can be made to decrease a WC activation threshold (e.g., from 5 m to 10 cm). WC activation threshold adjustments can be completed using any suitable sensor data values/thresholds.

Thus, aspects of the present disclosure recognize that a first set of sensor data can be obtained and compared to a first threshold, and based on the comparison (e.g., greater than, less than, equal to), a first WC activation threshold adjustment (increase or decrease by a first magnitude) can be made. Similarly, a second set of sensor data can be obtained and compared to a second threshold, and based on the comparison (e.g., greater than, less than, equal to), a second WC activation threshold adjustment (increase or decrease by a second magnitude) can be made.

In embodiments, the magnitude of the adjustment made to a WC activation threshold can depend on the magnitude of the sensor data readings. For example, a sensor value reading of 50-100 BPM can lead to a 5 meter increase in a WC activation threshold while a sensor value reading of 100-150 BPM can lead to a 10 meter increase in a WC activation threshold. Any suitable mapping of sensor value magnitudes to threshold increases/decreases can be implemented. Any suitable relationship between sensor value magnitude and threshold adjustment magnitude can be implemented (e.g., direct relationships, linear or non-linear relationships, inverse relationships, etc.).

In embodiments, a rate of change of sensor data can be compared to a rate of change threshold to determine whether to make WC activation threshold adjustments. For example, if a rate of change of a particular set of sensor data (e.g., 10 BPM/s) exceeds a rate of change threshold (e.g., 5 BPM/s), then a determination can be made to increase a WC activation threshold. This can be completed using the rate of change of any suitable sensor data metric.

Thus, aspects of the present disclosure recognize that a first set of sensor data can be obtained, a rate of change of the first set of sensor data over a first time period can be calculated, and the rate of change of the first set of sensor data can be compared to a first threshold. Based on the comparison (e.g., greater than, less than, equal to), a first WC activation threshold adjustment (increase or decrease by a first magnitude) can be made. Similarly, a second set of sensor data can be obtained, a second rate of change of the second set of sensor data over a second time period can be calculated, and the second rate of change of the second set of sensor data can be compared to a second threshold. Based on the second comparison (e.g., greater than, less than, equal to), a second WC activation threshold adjustment (increase or decrease by a second magnitude) can be made.

The magnitude of the adjustment made to a WC activation threshold can depend on the magnitude of the rate of change of sensor data readings. For example, a rate of change of a breathing rate 5 breaths per minute/second can lead to a first WC activation threshold adjustment (e.g., +5 meters) while a second rate of change of a breathing rate 10 breaths per minute/second can lead to a second WC activation threshold adjustment (e.g., +10 meters). Any suitable mapping of sensor value rate of change magnitudes to threshold magnitude increases/decreases can be implemented. Any suitable relationship between sensor value rate of change magnitude and threshold adjustment magnitude can be implemented (e.g., direct relationships, linear or non-linear relationships, inverse relationships, etc.).

In some embodiments, a classification (e.g., output by a machine learning model such as a neural network) of sensor data can lead to a particular WC threshold adjustment. For example, assume during a WC transaction an image (or video) was captured of a user's face prior to and after the transaction. If an emotion detection model run on the image of the user's face indicated that the user was any of the following classifications: "frustrated," "sad," "annoyed," or "confused," then a determination can be made to increase the WC transaction threshold (e.g., from 10 meters to 50 meters). This can be completed using any suitable classification and any suitable corresponding WC transaction adjustment.

Classifications used to adjust WC activation thresholds can include speech or facial based recognition algorithms. These include tone, diction, and emotion classification algorithms. These algorithms may be integrated within the sensor data analyzer 220 or remotely accessed via network 250. An example algorithm capable of analyzing tone and classifying sentiment is IBM Watson™ Tone Analyzer.

Aspects of the present disclosure recognize that pre-processing of data may be required in order to properly classify the data. For example, if audio data is captured, speech to text conversion may be required for proper classification of the audio data. Similarly, image pre-processing techniques (e.g., brightness transformations, geometric transformations, pixel alterations, etc.) may be required for proper classification of image data.

Thus, aspects of the present disclosure recognize that the determination of a first classification (e.g., a first tone or emotion) can lead to a first WC activation threshold adjustment (e.g., increase or decrease by a first magnitude), while the determination of a second classification (e.g., a second tone or emotion) can lead to a second WC activation threshold adjustment (e.g., increase or decrease by a second magnitude) as set forth in rules 225.

In some embodiments, keywords identified within audio data associated with a WC transaction can lead to a WC activation threshold adjustment. For example, rules 225 can include a mapping of keywords to WC activation threshold adjustments. The identification of one or more keywords within rules 225 can lead to a corresponding WC activation threshold adjustment. For example, the identification of keywords "mistake" or "accident" within an audio recording can lead to a decrease in a WC activation threshold.

Thus, aspects of the present disclosure recognize that the identification of a first keyword or set of keywords within an audio recording can lead to a first WC activation threshold adjustment (e.g., increase or decrease by a first magnitude), while the detection of a second keyword or set of keywords within an audio recording can lead to a second WC activation threshold adjustment (e.g., increase or decrease by a second magnitude) as set forth in rules 225.

In embodiments, time/location data can be used to adjust WC activation thresholds. For example, in response to detecting that a WC transaction occurred at a particular time and/or location (e.g., a target location), a corresponding WC activation threshold adjustment can be made. For example, if a user was located at a location "mall" at "6:00 pm" while a WC transaction was made, then the WC activation threshold associated with the transaction could be decreased. Any suitable WC activation threshold can be made based on time/location.

Thus, aspects of the present disclosure recognize that the identification of a first time (e.g., time of day, day of week, month, etc.) and/or first location (e.g., GPS coordinate, geofence, region, state, country, etc.) can lead to a first WC activation threshold adjustment (e.g., increase or decrease by a first magnitude), while the identification of a second time and/or second location can lead to a second WC activation threshold adjustment (e.g., increase or decrease by a second magnitude) as set forth in rules 225.

In embodiments, multiple factors can be simultaneously considered when determining whether to make WC activation threshold adjustments. That is, factors such as sensor value readings, classifications, keywords, time/location, and others can be simultaneously considered when determining whether to make WC activation threshold adjustments. In some embodiments, a WC activation adjustment score can be calculated based on a plurality of weighted factors and compared to a threshold to determine whether a WC adjustment should be made. The WC adjustment score can be calculated according to a formula WC Activation Adjustment Score=$factor_1 \times weight_1 + factor_2 \times weight_2 \ldots + factor_n \times weight_n$. The WC activation adjustment score can then be compared to a threshold or table (e.g., a table mapping score values to threshold changes) to determine whether a WC activation threshold should be made (and the magnitude of the change).

Values for factors (e.g., $factor_1$-$factor_n$) can be assigned/determined in any suitable manner. For example, if a keyword match is taken into consideration as a factor, a value of "1" can be assigned if a particular keyword match is found and a value of "0" can be assigned if the keyword match is not found. Similarly, if a classification match is taken into consideration as a factor, a value of "1" can be assigned if a particular classification match is found and a value of "0" can be assigned if a classification match is not found. As another example, if heart rate sensor readings are taken into consideration as a factor, a value of "1" can be assigned at a first BPM range (e.g., 125-150), a value of "0.75" can be assigned at a second BPM range (e.g., 100-125), a value of "0.50" can be assigned at a third BPM range (e.g., 75-100), etc.

Weights (e.g., $weight_1$-$weight_n$) assigned to factors can similarly be assigned/determined in any suitable manner. In embodiments, factors most likely to impact a WC activation threshold alteration are assigned a high weight whereas factors least likely to impact the WC activation threshold alteration are assigned a low weight. For example, following the example above, the keyword match factor could have a weight of 0.50, the classification match factor could have a weight of 0.30, and the heartrate sensor BPM readings could have a weight of 0.20.

Following the example above, if a keyword match is found, a classification match is not found, and a BPM is recorded at 80 BPM, the WC activation adjustment score can be calculated as (1×0.50)+(0×0.30)+(0.5×0.20)=0.60. In this example, if a threshold was defined as 0.50 such that any WC activation adjustment score exceeding 0.50 leads to a WC activation threshold increase by 10 meters, then the WC activation threshold would be increased by 10 meters. Though reference is made to example calculations, any suitable values can be substituted for those shown. Further, any suitable WC activation threshold adjustment can be made based on an observed WC activation adjustment score without departing from the spirit or scope of the present disclosure.

In some embodiments, the various factors discussed above can be used for predictive WC activation threshold adjustments prior to transactions actually occurring. For example, if a user typically engages in an NFC transaction at a first location, in response to determining that the user is approaching or at the first location, a WC activation threshold associated with the NFC transaction can be altered. This can be completed using any suitable factor(s) for predictively altering a WC activation threshold prior to a transaction actually occurring. For example, biometric data, audio data, image data, location data, and time data can all be used to predictively alter WC activation thresholds prior to transactions occurring.

The WC activation threshold adjuster 230 is configured to alter (i.e., change, adjust, modify, etc.) WC activation thresholds based on indications received from sensor data analyzer 220. The WC activation threshold adjuster 230 can alter WC activation thresholds in any suitable manner. In some embodiments, the WC activation threshold adjuster 230 can alter WC activation thresholds by altering the physical characteristics of the wireless communication protocol. In these embodiments, the WC activation threshold adjuster 230 can be configured to adjust the frequency and/or power associated with the wireless linkage. Frequency and power of wireless linkages directly affects their range, and as such, can be used to adjust WC activation thresholds between devices.

In some embodiments, activation thresholds can be defined within the maximum range of the wireless link. For example, a user can explicitly set a range at which pairing is permitted to occur, even if the maximum range at which pairing can occur exceeds this set range. This can be completed based on at least one metric (e.g., distance, signal strength) between the to-be-paired devices. As an example, GPS data collected from sensors 275-1 and 275-2 of devices 270-1 and 270-2, respectively, can be leveraged to determine a distance between the devices 270-1 and 270-2. In this example, the devices 270-1 and 270-2 may only be allowed to be paired if the GPS indicated distance between the devices 270-1 and 270-2 is within a distance threshold. As another example, signal strength data collected from sensors 275-1 and 275-2 of devices 270-1 and 270-2, respectively, can be leveraged to determine a signal strength (e.g., received signal strength indicator (RSSI)) between the devices 270-1 and 270-2. In this example, devices 270-1 and 270-2 may only be allowed to be paired if the signal strength between the devices 270-1 and 270-2 exceeds a signal strength threshold.

The learning module 235 of the WC management system 205 can be configured to adjust rules 225 based on transaction observations over time. Adjusting rules 225 over time can be completed to more closely mirror WC activation thresholds to a user's intentions. For example, if it is observed that keyword matching tends to more closely mirror the user's intention based on WC transaction updates over time, rules 225 can assign a higher weight to keyword matching conditions. The learning module 235 can add, remove, or modify rules 225 in any suitable manner.

In embodiments, the learning module 235 can utilize machine learning techniques to identify rules 225 that are effective at matching a user's intentions. For example, a machine learning algorithm can ingest many transactions occurring for a given device and fine tune the rules 225 for the device based on patterns recognized among the transactions.

In embodiments, user feedback can be requested after a WC transaction occurs to gauge whether the user was satisfied or dissatisfied with the transaction. This can be used by the learning module 235 to adjust rules 225 for future WC transactions (e.g., by providing reward/punishment to a supervised reinforcement machine learning algorithm). For example, if a user is satisfied with a given WC transaction and a WC activation threshold was not adjusted (e.g., rules 225 suggest that the correct WC activation threshold is already set), then positive feedback can be issued. If a user is dissatisfied with a given WC transaction and a WC transaction threshold was not adjusted (e.g., rules 225 suggest that the correct WC activation threshold has not been set), then negative feedback can be issued. If a user is satisfied with a given WC transaction and a WC activation threshold was adjusted, then negative feedback can be issued. Further, if a user is dissatisfied with a given WC transaction and a WC activation threshold was adjusted, then positive feedback can be issued.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the WC transaction log 240 can be analyzed or utilized as training data using any of the aforementioned machine learning algorithms.

More specifically, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Referring now to FIG. 3, shown is an example transaction log 300 depicting transaction records associated with a given device (hereinafter referred to as a "user device"), in accordance with embodiments of the present disclosure. The transaction log includes a first transaction, a second transaction, and a third transaction. Each transaction includes a device identifier, a corresponding set of sensor data, a current NFC threshold indication, and a threshold action indicator.

As depicted in FIG. 3, the first transaction was completed with Device #1. The sensor data collected from the user's device during the WC transaction (e.g., a predetermined period before and after the transaction) included a biometric reading (100 BPM), a location (Library), a time (6:00 PM), an audio clip, and image data. Further, the transaction log 300 includes the current WC activation threshold between the user's device and Device #1 (25 meters). Based on the analysis of the sensor data associated with the WC transaction with Device #1, the WC activation threshold was maintained at 25 meters.

The second transaction was completed between the user's device and Device #2. The sensor data collected from the user's device during the second WC transaction included a biometric reading (80 BPM), a location (Home), a time (7:00 PM), an audio clip, and image data. Further, the transaction log 300 includes the current WC activation threshold between the user's device and Device #2 (25 meters). Based on the analysis of the sensor data associated with the WC transaction with Device #2, the WC activation threshold was increased to 50 meters.

The third transaction was also completed between the user's device and Device #2. The sensor data collected from the user's device during the third WC transaction included a biometric reading (120 BPM), a location (Home), a time (9:00 AM), an audio clip, and image data. Further, the transaction log 300 includes the current WC activation threshold between the user's device and Device #2 (50 meters). Based on the analysis of the sensor data associated with the WC transaction with Device #2, the WC activation threshold was decreased to 35 meters.

The above transaction log 300 depicts example data that may be included in a transaction log and is not intended to limit aspects of the present disclosure. Transaction logs can include more or less data than depicted in FIG. 3. Further, though the transaction log 300 only includes transactions between a user's device and two other devices, in embodiments, a transaction log can include transactions between many different devices.

Figure 4:
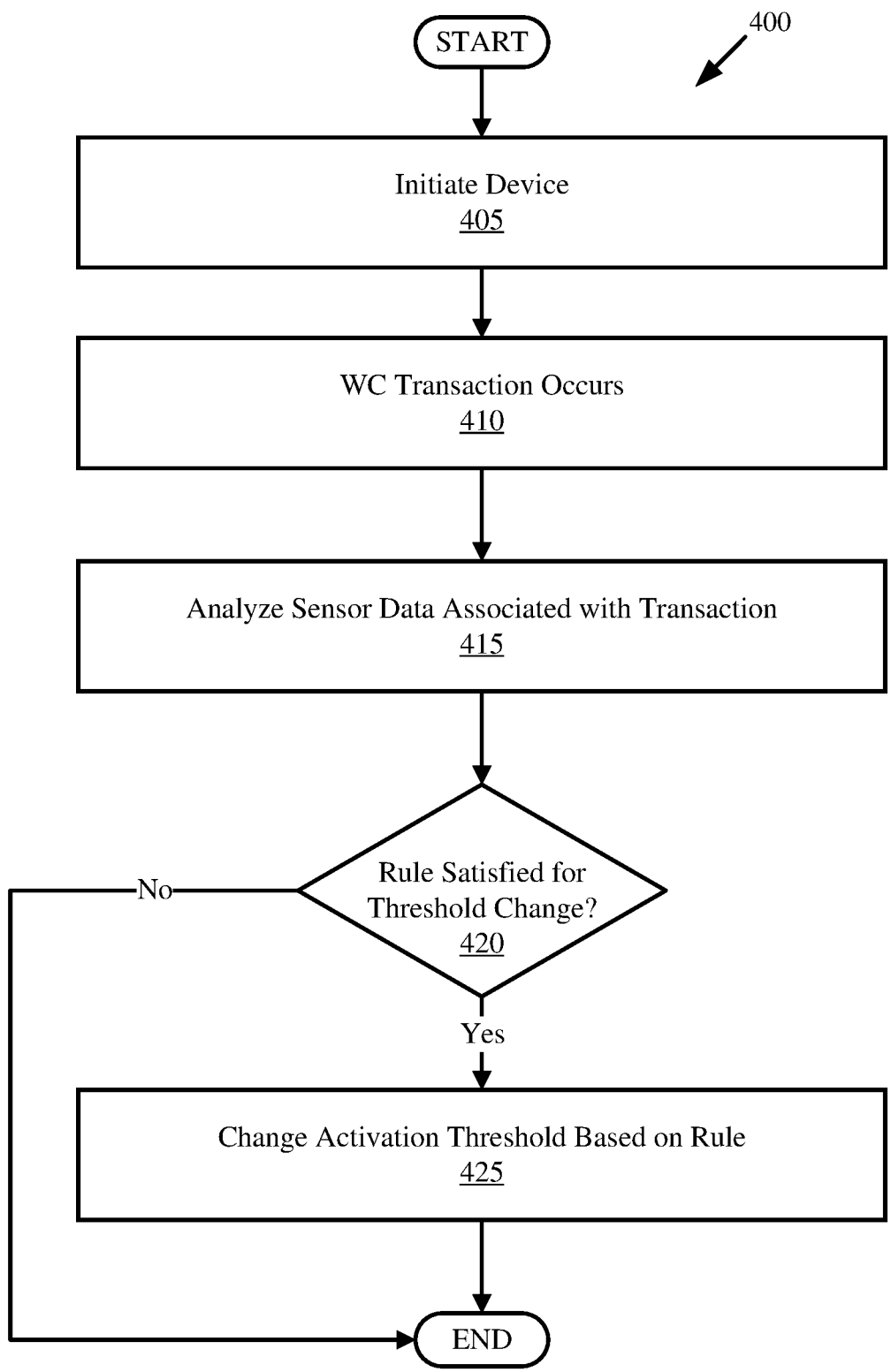
FIG. 4 is a flow diagram depicting a method for adjusting a WC activation threshold based on collected sensor data, in accordance with embodiments of the present disclosure.

Referring now to FIG. 4, shown is a flow diagram of an example method 400 for adjusting a WC activation threshold based on sensor data, in accordance with embodiments of the present disclosure. Method 400 initiates at operation 405, where a device is initiated. The device can be initiated by powering on the device and enabling wireless communication (e.g., WiFi or Bluetooth).

At operation 410, a WC transaction occurs. The WC transaction can include pairing the device with a second device and allowing data transfer between the paired devices. The WC transaction duration can vary. For example, a WC transaction can be completed in a matter of seconds (e.g., an NFC card emulation transaction) or minutes (e.g., a Bluetooth pairing with a smart speaker) depending on the nature of the transaction.

Sensor data associated with the transaction is analyzed. This is illustrated at operation 415. Sensor data can include any sensor data described with respect to sensor data 255 of FIG. 2 or transaction log 300 of FIG. 3. Further, sensor data can be analyzed using any techniques described with respect to the sensor data analyzer 220 of FIG. 2. For example, sensor data values can be compared to one or more thresholds, sensor data can be classified and a determination can be made whether a particular classification is identified, keywords can be extracted from sensor data to determine whether any keyword matches are identified, location and/or time data can be analyzed, etc.

In embodiments, sensor data can be collected over a predetermined time period prior to and/or after the transaction. For example, sensor data can be collected 10 seconds before and/or 10 seconds after the transaction, 1 minute before and/or 1 minute after the transaction, etc.

A determination is then made whether a rule for changing a WC activation threshold is satisfied. This is illustrated at operation 420. Determining whether a rule is satisfied for changing a WC activation threshold can be completed the same as, or substantially similar to, determining whether rules 225 of FIG. 2 are satisfied. For example, determining whether a rule is satisfied can include determining whether a sensor data threshold is exceeded, determining whether a classification of sensor data is matched, determining whether a keyword associated with sensor data is matched, determining whether a time and/or location is matched, etc.

If a determination is made that a rule for changing a WC activation threshold is not met, then method 400 ends. If a determination is made that a rule for changing a WC activation threshold is met, then the WC activation threshold is changed based on the rule. For example, rules 225 can specify the WC activation threshold change to be made (e.g., the magnitude and nature of the WC activation threshold change). In embodiments, WC activation thresholds can be adjusted the same as, or substantially similar to, as completed by WC activation threshold adjuster 230 of FIG. 2.

The aforementioned operations can be completed in any order and are not limited to those described. Additionally, some, all, or none of the aforementioned operations can be completed, while still remaining within the spirit and scope of the present disclosure.

Figure 5:
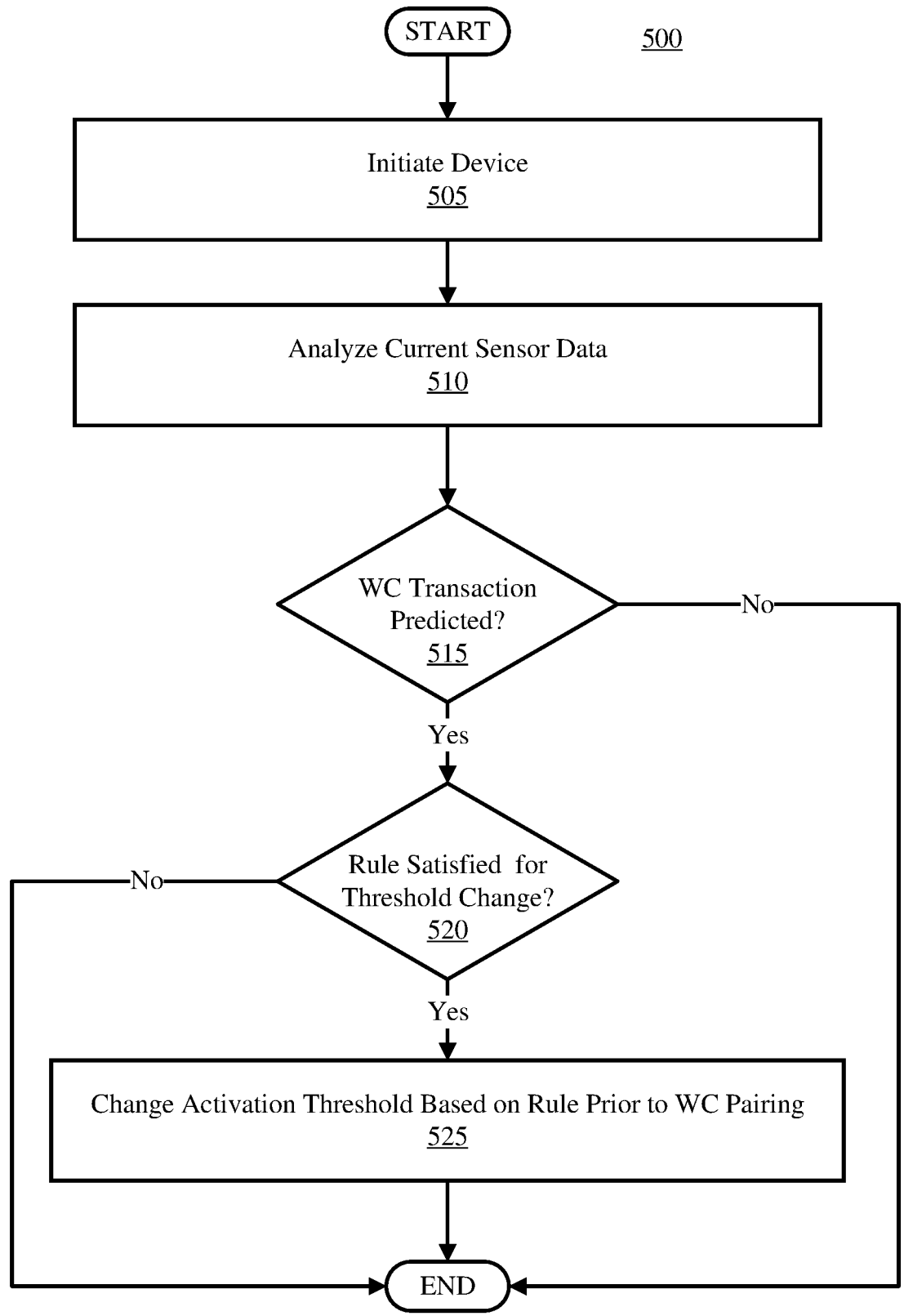
FIG. 5 is a flow diagram depicting a method for predictively adjusting a WC activation threshold prior to a WC transaction occurring, in accordance with embodiments of the present disclosure.

Referring now to FIG. 5, shown is a flow diagram of an example method 500 for predictively adjusting a WC activation threshold prior to a WC transaction occurring, in accordance with embodiments of the present disclosure.

Method 500 initiates at operation 505, where a device is initiated. The device can be initiated by powering on the device and enabling wireless communication (e.g., WiFi or Bluetooth). Current sensor data associated with the device is then analyzed. This is illustrated at operation 510. Sensor data can be analyzed the same as, or substantially similar to, as described with respect to the sensor data analyzer 220 of FIG. 2.

A determination is then made whether a WC transaction is about to occur based on the analysis of the sensor data. This is illustrated at operation 515. For example, rules 225 of FIG. 2 can be set that dictate whether a determination should be made that a WC transaction is about to occur. These rules can be based on location/time data, audio data, and other factors. For example, if a user typically engages in a WC transaction at a particular time and location, then a determination can be made that the user is about to engage in a WC transaction as the user approaches (e.g., enters a geofence and time-window) the particular time and location.

If a determination is made that a WC transaction is not predicted to occur, then method 500 ends. If a determination is made that a WC transaction is predicted to occur, then a determination is made whether a rule for changing a WC activation threshold is met. This is illustrated at operation 520. Operation 520 can be completed the same as, or substantially similar to, operation 420 of FIG. 4. However, it is noted that because the WC activation threshold is altered prior to the transaction, that the analyzed sensor data cannot include sensor data collected after the transaction is completed at operation 520 (whereas it could in operation 420).

If a determination is made that a rule for changing a WC activation threshold is not met, then method 500 ends. If a determination is made that a rule for changing a WC activation threshold is met, then the WC activation threshold is changed based on the rule. For example, rules 225 can specify the WC activation threshold change to be made (e.g., the magnitude and nature of the WC activation threshold change). In embodiments, WC activation thresholds can be adjusted the same as, or substantially similar to, as completed by WC activation threshold adjuster 230 of FIG. 2.

The aforementioned operations can be completed in any order and are not limited to those described. Additionally, some, all, or none of the aforementioned operations can be completed, while still remaining within the spirit and scope of the present disclosure.

Figure 6:
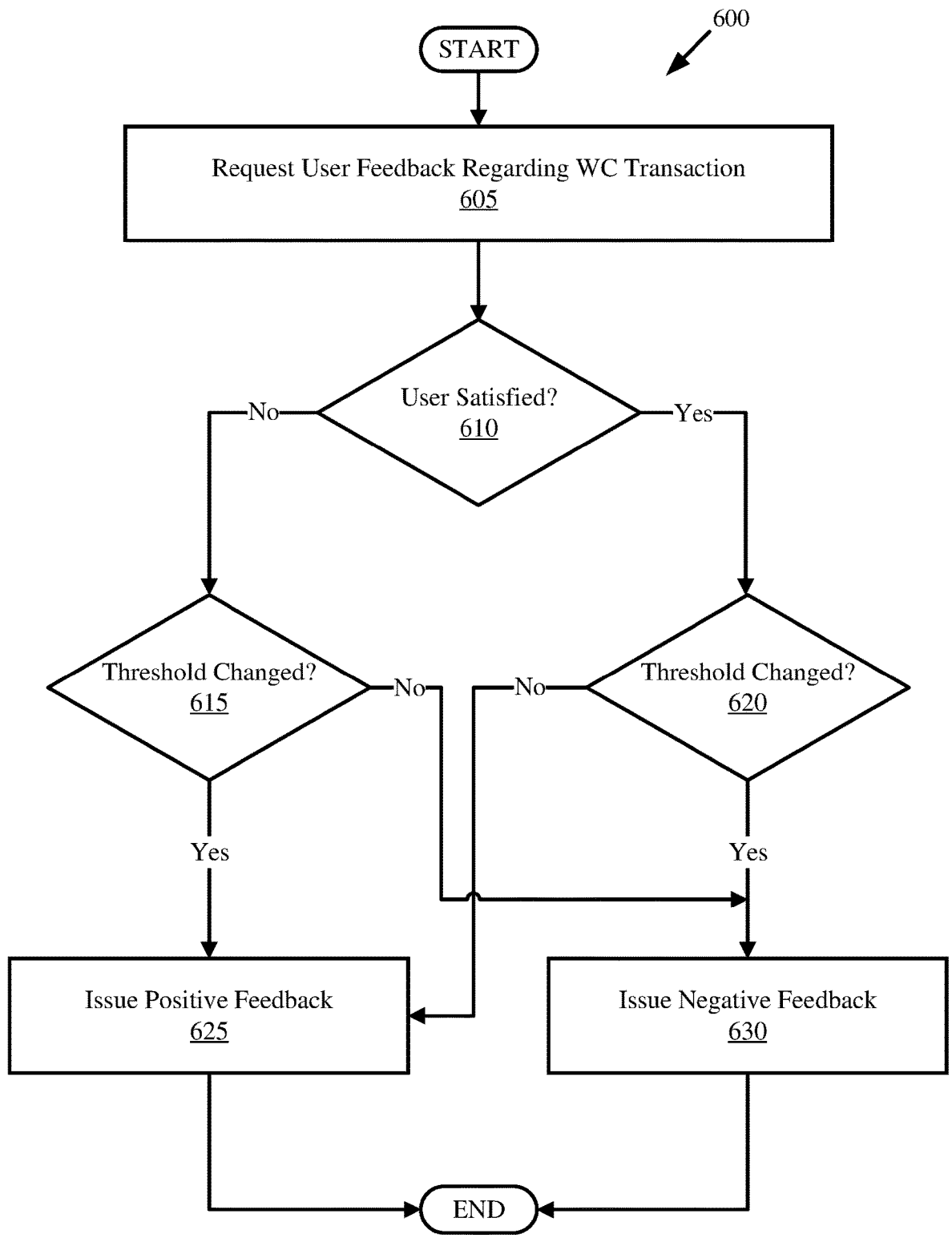
FIG. 6 is a flow diagram depicting a method for providing feedback to an algorithm configured to adjust rules for adjusting WC activation thresholds, in accordance with embodiments of the present disclosure.

Referring now to FIG. 6, shown is an example method 600 for providing feedback to an algorithm (e.g., a supervised reinforcement machine learning algorithm) configured to modify rules 225 associated with WC management system 205, in accordance with embodiments of the present disclosure.

Method 600 initiates at operation 605, where feedback regarding a WC transaction is requested. Requesting feedback can include prompting a user regarding their satisfaction with a given WC transaction. Feedback can be requested in any suitable manner. For example, feedback can be requested on a GUI of the WC management application (e.g., WC management application 280-1 and 280-2 of FIG. 2), via email, via an SMS text message, etc. In embodiments, the feedback can include prompting the user to input a satisfaction rating (e.g., a value from 1-5, with 5 being satisfied and 1 being dissatisfied). In embodiments, feedback can include inquiring specific circumstances of the WC transaction (e.g., "How many attempts were made?" "Was the connection reliable?" "Was the pairing distance suitable?", etc.). In embodiments, satisfaction can be derived based on the circumstances of the WC transaction.

A determination is made whether the user is satisfied with the WC transaction. This is illustrated at operation 610. If the user is not satisfied with the WC transaction, then a determination is made whether the WC activation threshold was changed based on sensor data associated with the WC transaction. This is illustrated at operation 615. If the user was not satisfied and the WC activation threshold was changed, then positive feedback (e.g., the action to change the threshold is rewarding to the ML algorithm) is issued at operation 625. If the user was not satisfied and the WC activation threshold was not changed at operation 615, then negative feedback is issued (e.g., the action to not change the threshold is not rewarding to the ML algorithm) at operation 630.

If the user was satisfied at operation 610, then a determination is made whether the WC activation threshold was changed based on sensor data associated with the WC transaction. This is illustrated at operation 620. If a determination is made that the user was satisfied with the WC transaction and the WC activation threshold was not changed, then positive feedback is issued at operation 625. If a determination is made that the user is satisfied and the WC activation threshold was changed, then negative feedback can be issued at operation 630. Method 600 then ends after feedback is provided.

Generally, the positive/negative feedback received based on users' satisfaction can be used to adjust the rules 225 based on the WC activation threshold alterations that were effective at matching the intentions of the user and the WC activation thresholds that were not effective at matching the intentions of the user.

The aforementioned operations can be completed in any order and are not limited to those described. Additionally, some, all, or none of the aforementioned operations can be completed, while still remaining within the spirit and scope of the present disclosure.

Figure 7:
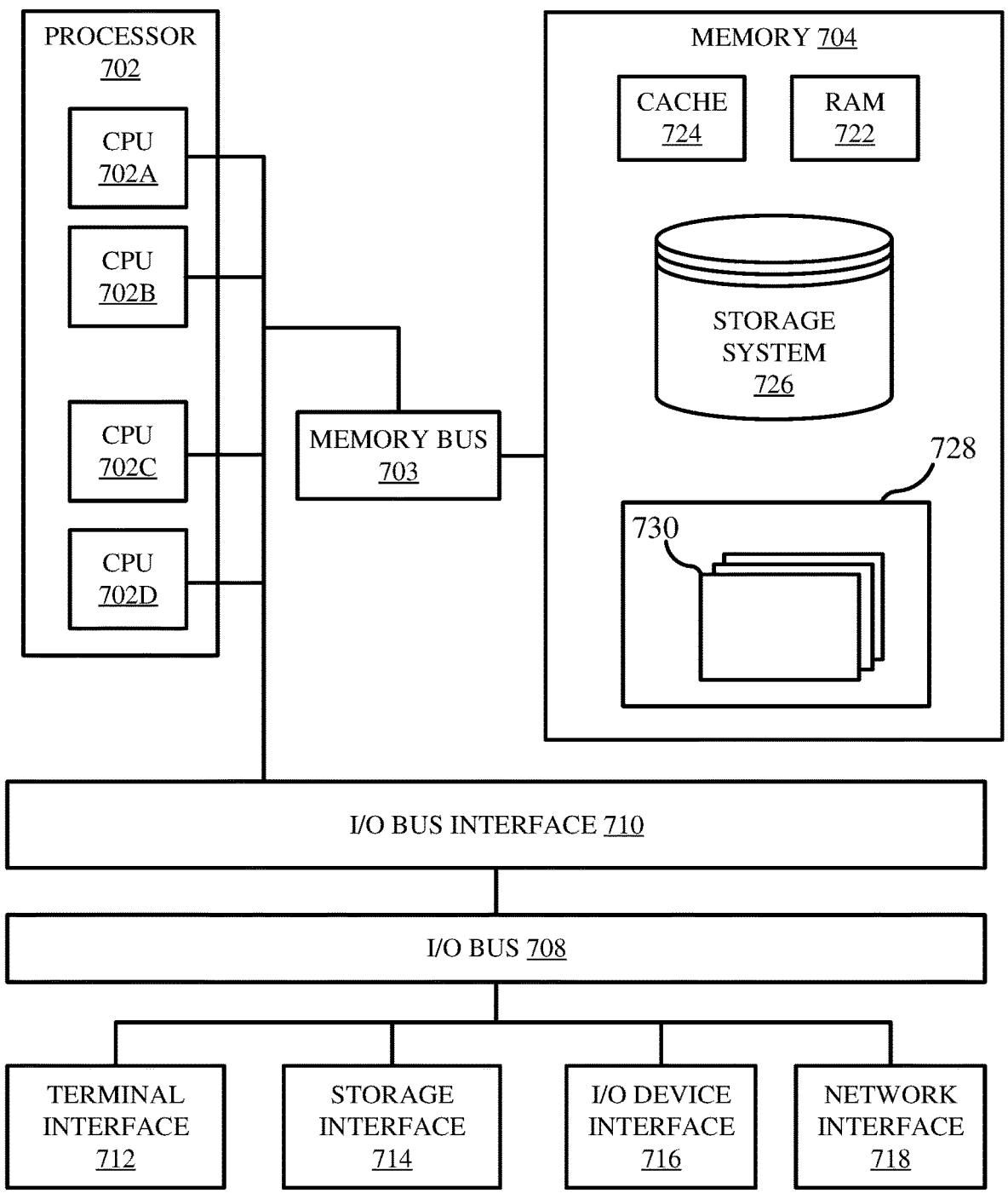
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., devices 105, server 135, and WC management system 205, devices 270) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
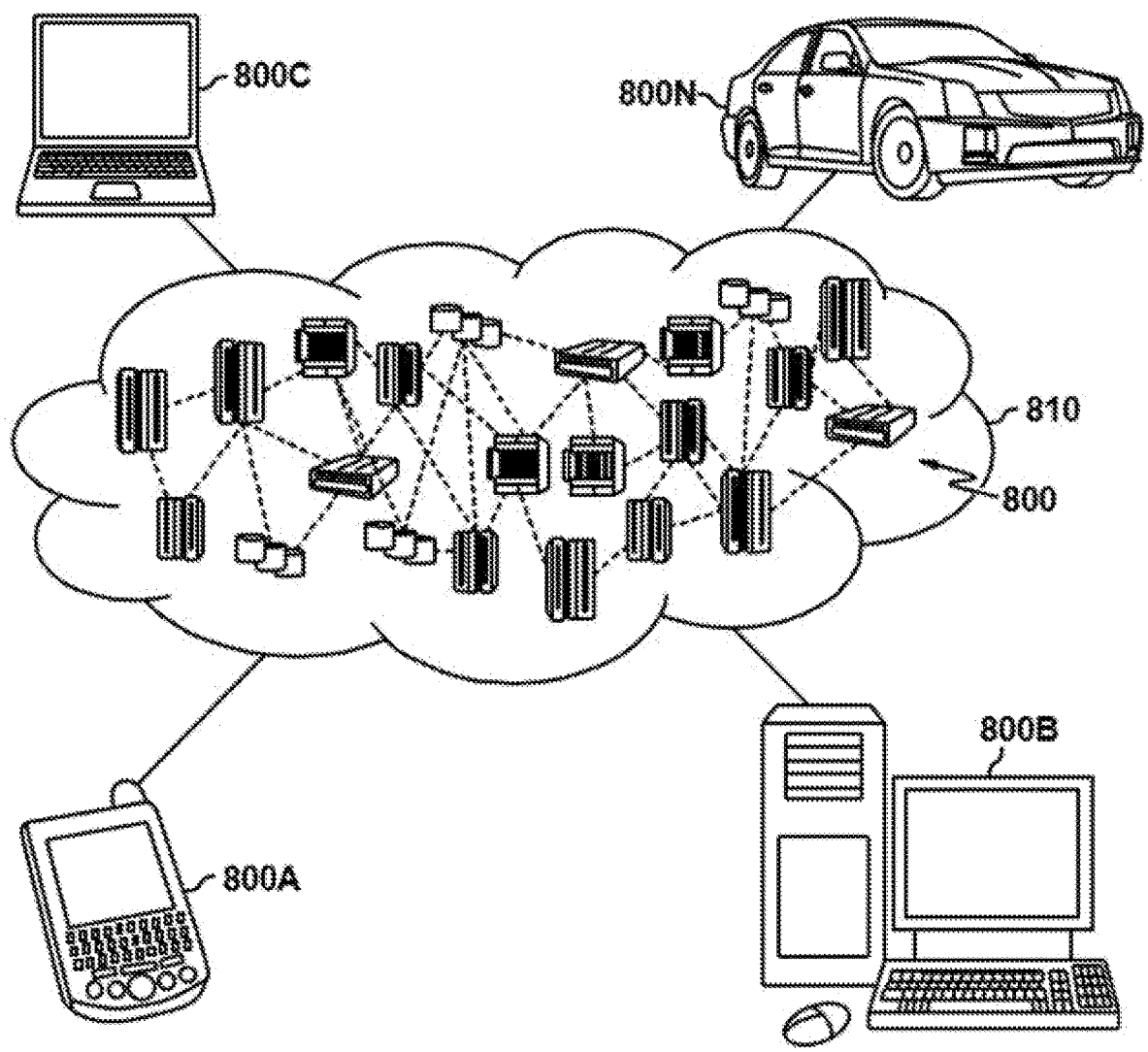
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A (e.g., devices 105 or 270), desktop computer 800B (e.g., server 135 and WC management system 205) laptop computer 800C, and/or automobile computer system 800N can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
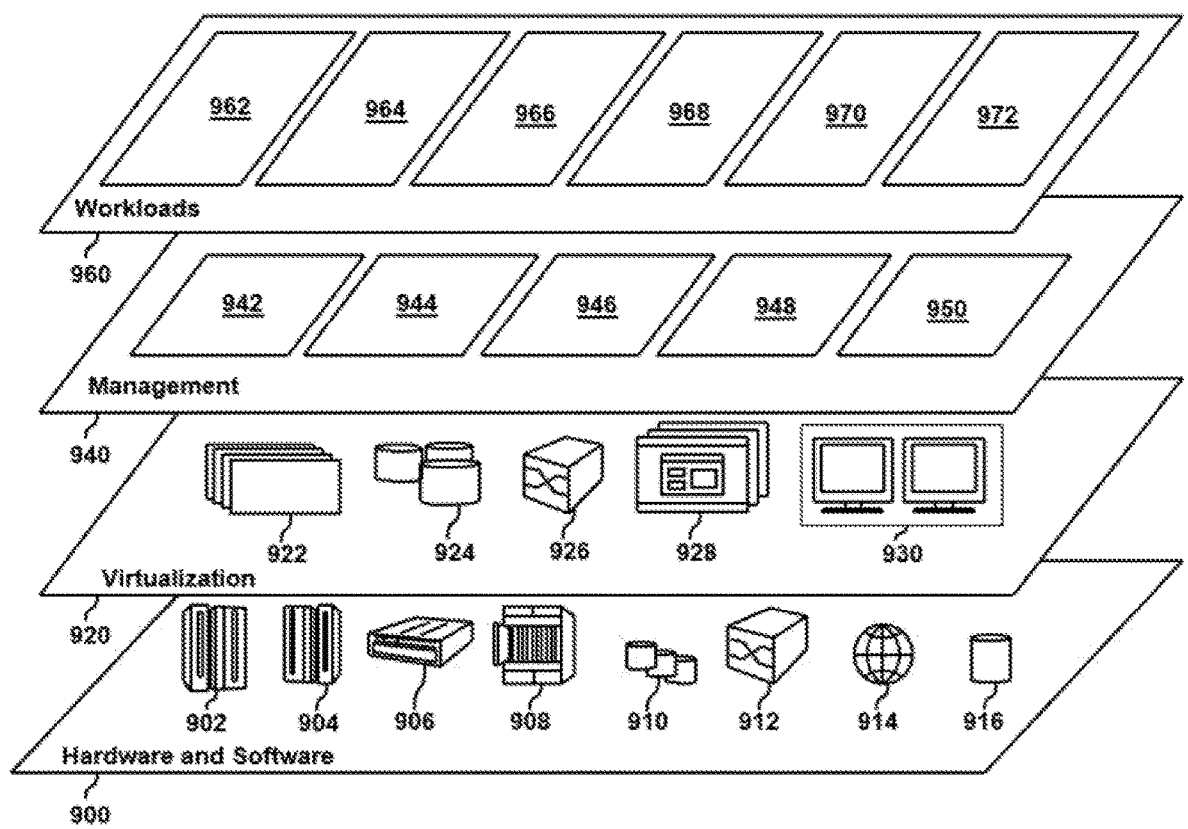
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices (e.g., devices 105 and 270) which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; image processing 964; natural language processing 966; wireless communication management 968; transaction processing 970; and data analytics processing 972.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:
    receiving a set of sensor data collected by a first device paired to a second device using a wireless communication (WC) protocol to complete a WC transaction;
    analyzing the set of sensor data to determine whether a rule for adjusting a WC activation threshold is satisfied, the WC activation threshold defining a distance at which the first device and second device are permitted to transfer data to each other;
    adjusting, in response to determining that the rule for adjusting the WC activation threshold is satisfied, the WC activation threshold;
    receiving a second set of sensor data from the first device;
    determining, based on an analysis of the second set of sensor data, that the first device is about to engage in a second WC transaction with a third device;
    analyzing, in response to determining that the first device is about to engage in the second WC transaction with the third device, the second set of sensor data to determine whether a second rule for adjusting a second WC activation threshold is satisfied, the second WC activation threshold defining a second distance at which the first device and the third device are permitted to transfer data to each other; and
    adjusting, in response to determining that the second rule for adjusting the second WC activation threshold is satisfied, the second WC activation threshold prior to the second WC transaction occurring.

2. The method of claim 1, wherein the set of sensor data includes image data, wherein analyzing the set of sensor data includes performing emotion detection on the image data to classify an emotion of the image, wherein the rule for adjusting the WC activation threshold is satisfied based on the classified emotion being a first emotion.

3. The method of claim 1, wherein the set of sensor data includes audio data, wherein analyzing the set of sensor data includes performing tone detection on the audio data to classify a tone of the audio data, wherein the rule for adjusting the WC activation threshold is satisfied based on the classified tone being a first tone.

4. The method of claim 1, further comprising:
    receiving, from a user of the first device, feedback indicating that the user was not satisfied with the WC transaction; and
    providing positive feedback to a machine learning algorithm configured to alter rules for adjusting WC transaction thresholds.

5. The method of claim 1, further comprising:
    receiving, from a user of the first device, feedback indicating that the user was satisfied with the WC transaction; and
    providing negative feedback to a machine learning algorithm configured to alter rules for adjusting WC transaction thresholds.

6. A system comprising:
    one or more processors; and
    one or more computer-readable storage media collectively storing program instructions which, when executed by the one or more processors, are configured to cause the one or more processors to perform a method comprising:
    receiving a set of sensor data collected by a first device paired to a second device using a wireless communication (WC) protocol to complete a WC transaction;
    analyzing the set of sensor data to determine whether a rule for adjusting a WC activation threshold is satisfied, the WC activation threshold defining a distance at which the first device and second device are permitted to transfer data to each other;
    adjusting, in response to determining that the rule for adjusting the WC activation threshold is satisfied, the WC activation threshold;
    receiving a second set of sensor data from the first device;
    determining, based on an analysis of the second set of sensor data, that the first device is about to engage in a second WC transaction with a third device;
    analyzing, in response to determining that the first device is about to engage in the second WC transaction with the third device, the second set of sensor data to determine whether a second rule for adjusting a second WC activation threshold is satisfied, the second WC activation threshold defining a second distance at which the first device and the third device are permitted to transfer data to each other; and
    adjusting, in response to determining that the second rule for adjusting the second WC activation threshold is satisfied, the second WC activation threshold prior to the second WC transaction occurring.

7. The system of claim 6, wherein the set of sensor data includes biometric data, wherein analyzing the set of sensor data includes comparing the biometric data to a biometric data threshold, wherein the rule for adjusting the WC activation threshold is satisfied based on at least one biometric value of the biometric data exceeding the biometric data threshold.

8. The system of claim 6, wherein the set of sensor data includes location data, wherein analyzing the set of sensor data includes determining whether the location data matches to a target location, wherein the rule for adjusting the WC activation threshold is satisfied based on at least one location of the location data matching to the target location.

9. The system of claim 6, wherein the method performed by the one or more processors further comprises:
receiving, from a user of the first device, feedback indicating that the user was not satisfied with the WC transaction; and
providing positive feedback to a machine learning algorithm configured to alter rules for adjusting WC transaction thresholds.

10. The system of claim 6, wherein the method performed by the one or more processors further comprises:
receiving, from a user of the first device, feedback indicating that the user was satisfied with the WC transaction; and
providing negative feedback to a machine learning algorithm configured to alter rules for adjusting WC transaction thresholds.

11. A non-transitory computer program product comprising one or more computer readable storage media, and program instructions collectively stored on the one or more computer readable storage media, the program instructions comprising instructions configured to cause one or more processors to perform a method comprising:
receiving a set of sensor data collected by a first device paired to a second device using a wireless communication (WC) protocol to complete a WC transaction;
analyzing the set of sensor data to determine whether a rule for adjusting a WC activation threshold is satisfied, the WC activation threshold defining a distance at which the first device and second device are permitted to transfer data to each other;
adjusting, in response to determining that the rule for adjusting the WC activation threshold is satisfied, the WC activation threshold;
receiving a second set of sensor data from the first device;
determining, based on an analysis of the second set of sensor data, that the first device is about to engage in a second WC transaction with a third device;
analyzing, in response to determining that the first device is about to engage in the second WC transaction with the third device, the second set of sensor data to determine whether a second rule for adjusting a second WC activation threshold is satisfied, the second WC activation threshold defining a second distance at which the first device and the third device are permitted to transfer data to each other; and
adjusting, in response to determining that the second rule for adjusting the second WC activation threshold is satisfied, the second WC activation threshold prior to the second WC transaction occurring.

12. The non-transitory computer program product of claim 11, wherein the set of sensor data includes image data, wherein analyzing the set of sensor data includes performing emotion detection on the image data to classify an emotion of the image, wherein the rule for adjusting the WC activation threshold is satisfied based on the classified emotion being a first emotion.

13. The non-transitory computer program product of claim 11, wherein the set of sensor data includes audio data, wherein analyzing the set of sensor data includes performing tone detection on the audio data to classify a tone of the audio data, wherein the rule for adjusting the WC activation threshold is satisfied based on the classified tone being a first tone.

14. The non-transitory computer program product of claim 11, wherein the method performed by the one or more processors further comprises:
receiving, from a user of the first device, feedback indicating that the user was not satisfied with the WC transaction; and
providing positive feedback to a machine learning algorithm configured to alter rules for adjusting WC transaction thresholds.

15. The non-transitory computer program product of claim 11, wherein the method performed by the one or more processors further comprises:
receiving, from a user of the first device, feedback indicating that the user was satisfied with the WC transaction; and
providing negative feedback to a machine learning algorithm configured to alter rules for adjusting WC transaction thresholds.

16. The non-transitory computer program product of claim 11, wherein the set of sensor data includes biometric data, wherein analyzing the set of sensor data includes comparing the biometric data to a biometric data threshold, wherein the rule for adjusting the WC activation threshold is satisfied based on at least one biometric value of the biometric data exceeding the biometric data threshold.

17. The non-transitory computer program product of claim 11, wherein the set of sensor data includes audio data, wherein analyzing the set of sensor data includes analyzing the audio data to determine whether a matching keyword is within the audio data, wherein the rule for adjusting the WC activation threshold is satisfied based on the matching keyword being within the audio data.

* * * * *